(12) United States Patent
Sugimoto et al.

(10) Patent No.: US 11,548,554 B2
(45) Date of Patent: Jan. 10, 2023

(54) VEHICLE REAR PORTION STRUCTURE

(71) Applicant: TOYOTA JIDOSHA KABUSHIKI KAISHA, Aichi-ken (JP)

(72) Inventors: Sota Sugimoto, Toyota (JP); Koji Tokuyama, Nishio (JP); Norimasa Koreishi, Miyoshi (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 288 days.

(21) Appl. No.: 16/790,743

(22) Filed: Feb. 14, 2020

(65) Prior Publication Data
US 2020/0290679 A1 Sep. 17, 2020

(30) Foreign Application Priority Data
Mar. 15, 2019 (JP) .............................. JP2019-049043

(51) Int. Cl.
| | | |
|---|---|---|
| *B62D 21/02* | (2006.01) | |
| *B62D 27/02* | (2006.01) | |
| *B62D 25/20* | (2006.01) | |
| *B62D 25/16* | (2006.01) | |
| *B62D 25/02* | (2006.01) | |

(52) U.S. Cl.
CPC ........... *B62D 21/02* (2013.01); *B62D 25/025* (2013.01); *B62D 25/16* (2013.01); *B62D 25/2027* (2013.01); *B62D 27/02* (2013.01)

(58) Field of Classification Search
CPC ...... B62D 21/02; B62D 25/025; B62D 25/16; B62D 25/2027; B62D 27/02; B62D 25/02; B62D 25/04; B62D 25/087; B62D 21/15; B62D 25/08
See application file for complete search history.

(56) References Cited

U.S. PATENT DOCUMENTS

| | | | | |
|---|---|---|---|---|
| 5,855,407 A * | 1/1999 | Fukuda | ................ | B62D 25/087 |
| | | | | 296/203.03 |
| 9,499,206 B2 * | 11/2016 | Sugano | ................ | B62D 25/04 |
| 11,267,517 B2 * | 3/2022 | Ito | ........................ | B62D 27/023 |
| 2013/0341970 A1 * | 12/2013 | Shimizu | ................ | B62D 25/02 |
| | | | | 296/193.08 |
| 2015/0137559 A1 * | 5/2015 | Lee | ........................ | B62D 25/20 |
| | | | | 296/193.07 |

(Continued)

FOREIGN PATENT DOCUMENTS

| | | | |
|---|---|---|---|
| JP | 200669268 A | 3/2006 | |
| JP | 2015-101298 A | 6/2015 | |

(Continued)

*Primary Examiner* — Darlene P Condra
(74) *Attorney, Agent, or Firm* — Hauptman Ham, LLP (57) ABSTRACT

A vehicle rear portion structure includes a cross member that extends in a vehicle width direction at a vehicle rear, a rear wheel house that accommodates a rear tire, a rear pillar that extends in a vehicle vertical direction, a reinforcing member that connects the rear pillar with the rear wheel house, and a joining member that connects a lower end portion of the reinforcing member with one end portion of the cross member. The rear pillar is divided into a general portion and a high-rigidity portion. The high-rigidity portion is connected to an upper end portion of the general portion and is specified with a higher rigidity than the general portion. The reinforcing member is connected to the high-rigidity portion.

11 Claims, 4 Drawing Sheets

(56) References Cited

U.S. PATENT DOCUMENTS

| | | | |
|---|---|---|---|
| 2016/0272250 A1 | 9/2016 | Yokoi | |
| 2017/0197664 A1 | 7/2017 | Yoshida et al. | |
| 2018/0178849 A1* | 6/2018 | Saito | B62D 25/087 |
| 2019/0344835 A1* | 11/2019 | Nishioka | B62D 25/20 |
| 2020/0269928 A1* | 8/2020 | Ishimoto | B62D 25/087 |
| 2021/0086837 A1* | 3/2021 | Sato | B62D 25/06 |

FOREIGN PATENT DOCUMENTS

| | | | | |
|---|---|---|---|---|
| JP | 2015196467 A | 11/2015 | | |
| JP | 2017-124687 A | 7/2017 | | |
| WO | WO-2014181739 A1 * | 11/2014 | | B62D 25/04 |
| WO | WO-2019172127 A1 * | 9/2019 | | B62D 25/00 |

* cited by examiner

VEHICLE REAR PORTION STRUCTURE

CROSS-REFERENCE TO RELATED APPLICATION

This application is based on and claims priority under 35 USC 119 from Japanese Patent Application No. 2019-049043 filed on Mar. 15, 2019, the disclosure of which is incorporated by reference herein.

BACKGROUND

Technical Field

The present disclosure relates to a vehicle rear portion structure.

Related Art

Japanese Patent Application Laid-Open (JP-A) No. 2017-124687 (Patent Document 1) discloses a vehicle rear portion structure provided with: a cross member that connects between a pair of side frames; a rear quarter pillar; a rear wheel house that is disposed below the rear quarter pillar and accommodates a rear tire; a connecting member that connects one end portion of the cross member with a lower end portion of the rear quarter pillar so as to extend across the rear wheel house; and a rear pillar disposed to the rear of the rear quarter pillar. The quarter pillar and the rear pillar are connected by a reinforcing member.

In Patent Document 1, a load inputted from the rear wheel house may be distributed between a transmission path through the connecting member to the quarter pillar and the rear pillar, and a transmission path through the connecting member to the cross member. Thus, a torsional deformation of the vehicle (a deformation that tilts a side panel in the vehicle width direction) may be suppressed.

SUMMARY

In the vehicle rear portion structure recited in Patent Document 1, the rear pillar is disposed furthest from the rear wheel house at which an input force is applied. Thus, a torsional deformation is larger in a vicinity of the rear pillar to which a load passing through the joining member is transmitted than in a vicinity of the rear wheel house. To suppress torsional deformation of the vicinity of the rear pillar, for example, specifying a greater plate thickness of the rear pillar and raising a rigidity of the rear pillar can be considered.

However, with conventional technologies, because the rear pillar is structured by a single plate, this leads to an increase in vehicle weight and an increase in fabrication costs.

An object of the present disclosure is to provide a vehicle rear portion structure that may efficiently suppress torsional deformation of a vicinity of a rear pillar while suppressing an increase in vehicle weight.

Solution to Problem

A vehicle rear portion structure according to a first aspect of the present disclosure includes: a cross member that extends in a vehicle width direction at a vehicle rear; a rear wheel house that accommodates a rear tire; a rear pillar that extends in a vehicle vertical direction; a reinforcing member that connects the rear pillar with the rear wheel house; and a joining member that connects a lower end portion of the reinforcing member with one end portion of the cross member. The rear pillar is divided into a general portion, and a high-rigidity portion that is connected to an upper end portion of the general portion and has a higher rigidity than the general portion. The reinforcing member is connected to the high-rigidity portion.

In the vehicle rear portion structure according to the first aspect, the reinforcing member connects the rear wheel house with the high-rigidity portion of the rear pillar. Therefore, an input force working to cause a torsional deformation of the vehicle may be taken up by the cross member, rear wheel house, joining member, reinforcing member and high-rigidity portion that are high in rigidity.

In a vehicle rear portion structure according to a second aspect, in the vehicle rear portion structure according to the first aspect, the reinforcing member linearly connects the high-rigidity portion with the rear wheel house.

In the vehicle rear portion structure according to the second aspect, the reinforcing member connects the high-rigidity portion with the rear wheel house in a linear shape. Therefore, a torsional deformation of the vehicle may be efficiently taken up by the reinforcing member, in addition to which a length of the reinforcing member may be kept short.

In a vehicle rear portion structure according to a third aspect, in the vehicle rear portion structure according to the first aspect, the reinforcing member comprises a vertical extension portion that extends in the vehicle vertical direction from the rear wheel house, and a front—rear extension portion that extends toward the vehicle rear in a vehicle front-rear direction from an upper end portion, in the vehicle vertical direction, of the vertical extension portion.

In the vehicle rear portion structure according to the third aspect, because the reinforcing member includes the vertical extension portion and the front—rear extension portion, the reinforcing member may be inflected. Thus, a degree of freedom of positioning of the reinforcing member is raised.

In a vehicle rear portion structure according to a fourth aspect, in the vehicle rear portion structure according to any of the first to third aspects, the reinforcing member is divided, in a vehicle front-rear direction, into a front side reinforcing member and a rear side reinforcing member.

In the vehicle rear portion structure according to the fourth aspect, because the reinforcing member is divided between front and rear, the front side reinforcing member may be assembled to the joining member, and subsequently the front side reinforcing member may be assembled to the rear side reinforcing member that is joined to the rear pillar.

In a vehicle rear portion structure according to a fifth aspect, in the vehicle rear portion structure according to the fourth aspect, a rigidity of the front side reinforcing member is higher than a rigidity of the rear side reinforcing member.

In the vehicle rear portion structure according to the fifth aspect, the rigidity of the front side reinforcing member, which is closer to the rear wheel house at which a torsional deformation force is inputted, may be made higher than the rigidity of the rear side reinforcing member.

In a vehicle rear portion structure according to a sixth aspect, in the vehicle rear portion structure according to any of the first to fifth aspects, in a side view, a lower end portion, in a vehicle vertical direction, of the reinforcing member overlaps with a rear suspension in a vehicle the front-rear direction.

In the vehicle rear portion structure according to the sixth aspect, in the side view, the lower end portion, in a vehicle vertical direction, of the reinforcing member overlaps with the rear suspension in a vehicle front-rear direction. Therefore, a force in the vehicle vertical direction that is inputted from the rear suspension may be transmitted to the reinforcing member efficiently.

Advantageous Effects of Disclosure

The vehicle rear portion structure according to the first aspect may efficiently suppress torsional deformation of a vicinity of the rear pillar while suppressing an increase in vehicle weight.

The vehicle rear portion structure according to the second aspect may further suppress torsional deformation of the vicinity of the rear pillar while suppressing an increase in vehicle weight.

In the vehicle rear portion structure according to the third aspect, because the degree of freedom of positioning of the reinforcing member is raised, interference between the reinforcing member and other structural members may be suppressed.

In the vehicle rear portion structure according to the fourth aspect, the front side reinforcing member may be assembled to the joining member, and subsequently the front side reinforcing member may be assembled to the rear side reinforcing member to which the rear pillar is joined. Thus, ease of assembly of the vehicle is improved.

In the vehicle rear portion structure according to the fifth aspect, because a force inputted from the rear wheel house may be efficiently transmitted to the region of the reinforcing member with high rigidity, torsional deformation caused by the force inputted from the rear wheel house may be even further suppressed.

In the vehicle rear portion structure according to the sixth aspect, because a force inputted from the rear suspension may be efficiently transmitted to the reinforcing member, torsional deformation caused by the force inputted from the rear suspension may be even further suppressed.

BRIEF DESCRIPTION OF THE DRAWINGS

Preferred embodiments will be described in detail based on the following figures, wherein.

DETAILED DESCRIPTION

First Exemplary Embodiment

Figure 1:
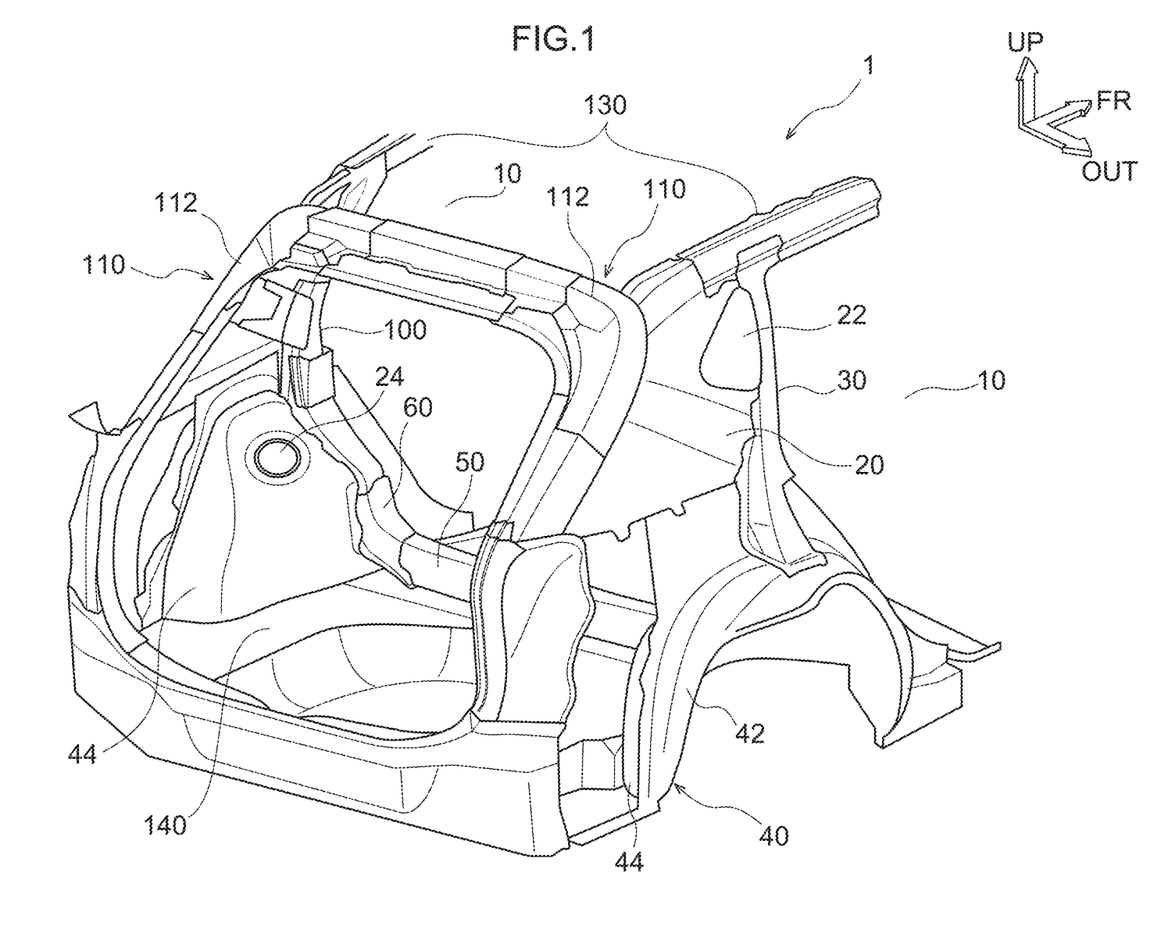
FIG. 1 is a perspective view in which a vehicle rear portion structure according to a first exemplary embodiment is seen from the rear.
Figure 2:
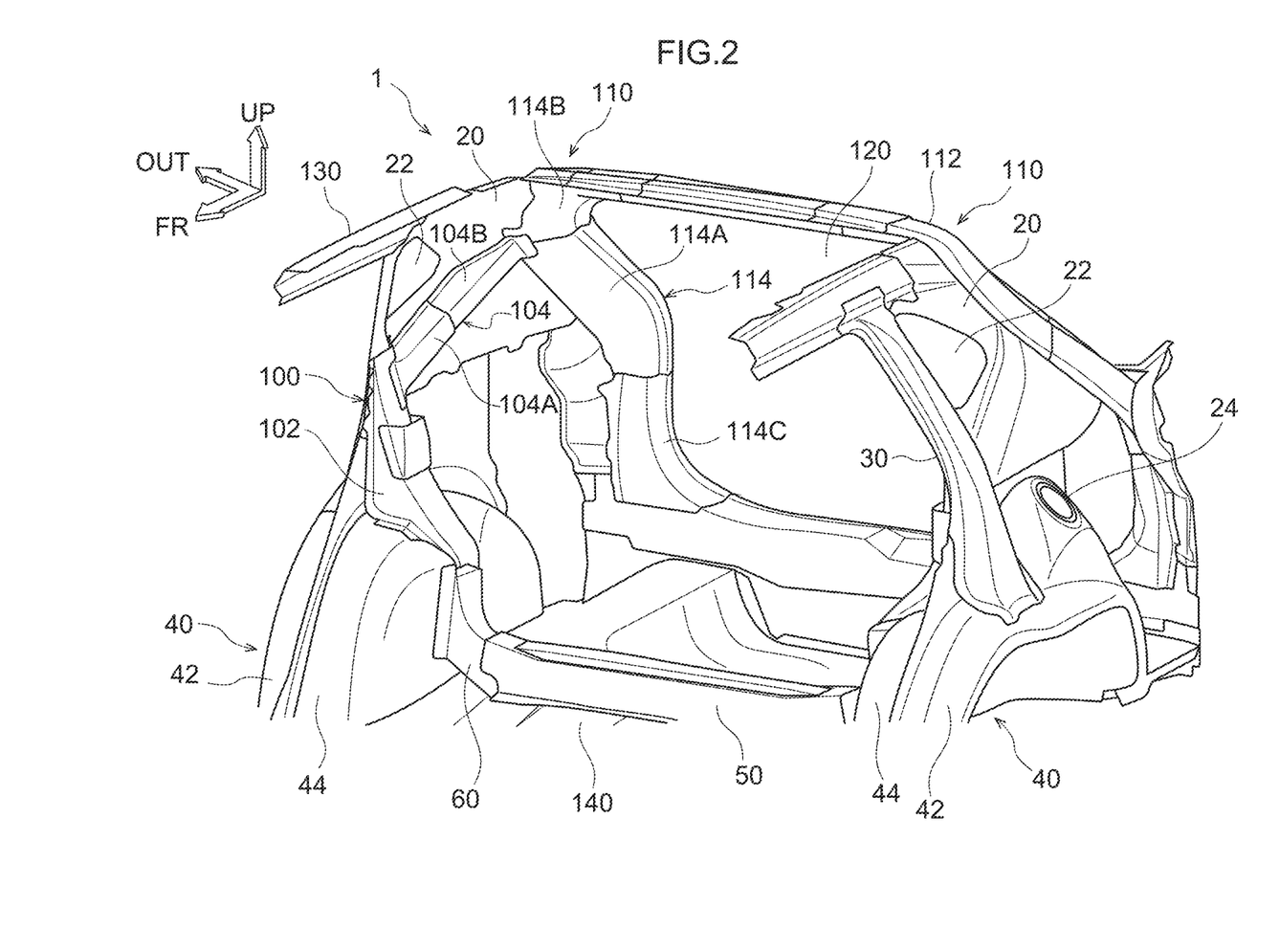
FIG. 2 is a perspective view in which the vehicle rear portion structure according to the first exemplary embodiment is seen from the front.
Figure 3:
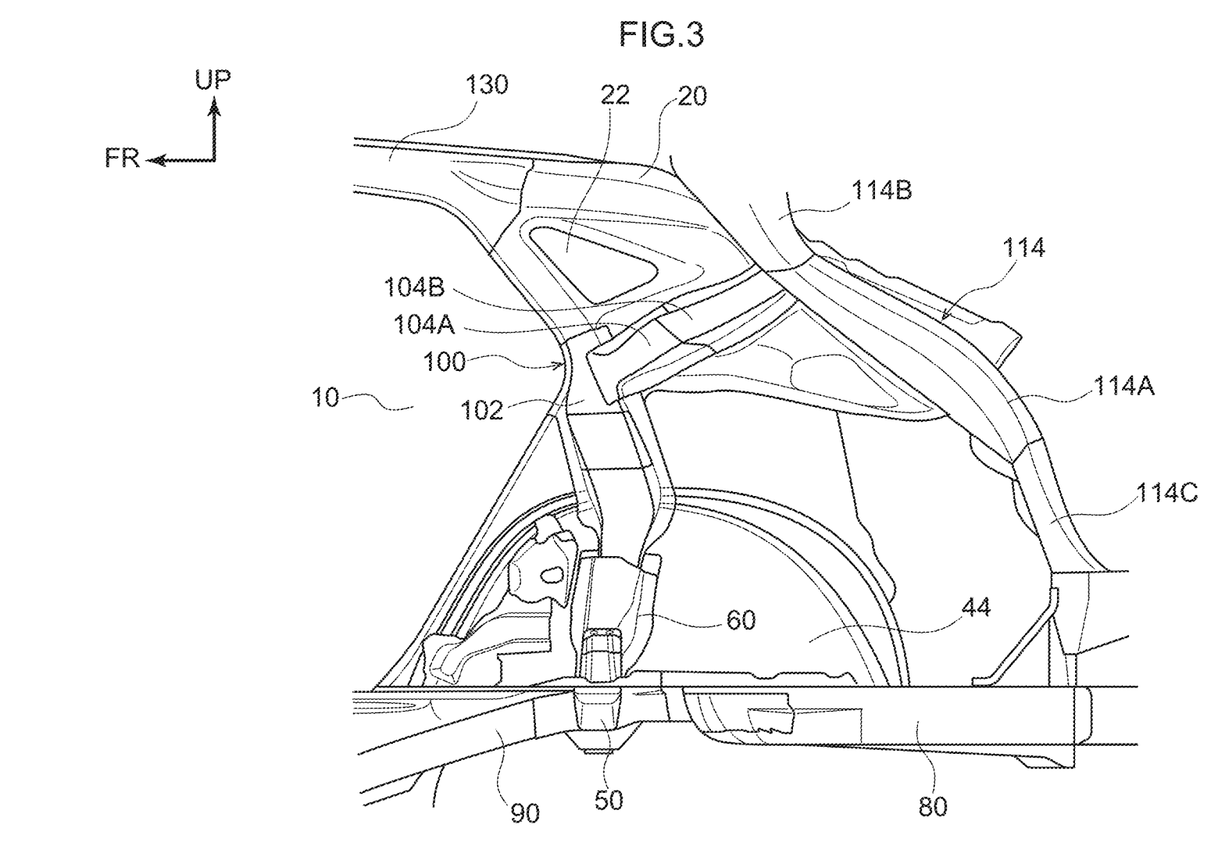
FIG. 3 is a side view in which a vehicle right side of the vehicle rear portion structure according to the first exemplary embodiment is seen from a vehicle inner side.

Now, a vehicle rear portion structure according to the first exemplary embodiment is described using FIG. 1 to FIG. 3. A vehicle front-and-rear direction front side is indicated by arrow FR, a vehicle width direction right side is indicated by arrow RH, and a vehicle vertical direction upper side is indicated by arrow UP. In the following descriptions, where the simple directions front, rear, upper and lower are indicated, these represent front and rear in the vehicle front-and-rear direction, and upper and lower in the vehicle vertical direction. For clarity of description, the following recitations and the drawings are simplified as appropriate.

As shown in FIG. 1, a vehicle 1 in which the vehicle rear portion structure according to the first exemplary embodiment is employed is a hatchback car in which a back door is provided at the vehicle rear end portion.

As shown in FIG. 1, at each of the left and right, a quarter pillar 30 is provided standing at the vehicle outer side of a rear side panel 20 that is disposed to the rear of a rear door aperture portion 10.

A triangular window aperture portion 22 for forming a triangular window is provided at the vehicle upper side of each rear side panel 20. A refueling aperture portion 24 for forming a refueling aperture is provided at the vehicle rear side of the rear side panel 20 relative to the quarter pillar 30.

A cross-sectional shape of the quarter pillar 30 orthogonal to a length direction thereof is formed in a hat shape that is open toward the vehicle width direction inner side. A chamber is formed by the quarter pillar 30 being bonded to vehicle width direction outer side faces of the rear side panel 20 and a rear wheel house outer 42, which is described below.

Upper end portions of the quarter pillars 30 are bonded to a left and right pair of roof side rails 130 that extend in the vehicle front-and-rear direction. The roof side rails 130 are bonded to a roof panel, which is not shown in the drawings, that covers the upper side of the vehicle 1.

A rear wheel house 40 for accommodating a rear tire, which is not shown in the drawings, is disposed at a lower portion of each quarter pillar 30. The rear wheel house 40 includes the rear wheel house outer 42, which structures the vehicle width direction outer side of the rear wheel house 40, and a rear wheel house inner 44, which structures the vehicle width direction inner side of the rear wheel house 40. The rear wheel house outer 42 and the rear wheel house inner 44 are bonded to the rear side panel 20 by flange portions, which are not shown in the drawings.

A rear cross member 50 extends in the vehicle width direction between the left and right rear wheel house inners 44. Each of two end portions in the vehicle width direction of the rear cross member 50 is connected with the corresponding rear wheel house inner 44 by a strainer 60.

A cross-sectional shape of the rear cross member 50 orthogonal to a length direction thereof is formed in a hat shape that is open toward the vehicle lower side. A chamber is formed by the rear cross member 50 being bonded to a vehicle upper side face of a floor panel 140.

A cross-sectional shape of each strainer 60 orthogonal to a length direction thereof is formed in a hat shape that is open toward the vehicle width direction outer side. A chamber is formed by the strainer 60 being bonded to vehicle inner side faces of the rear side panel 20 and the rear wheel house inner 44.

As shown in FIG. 3, a rear side member 80 is disposed at a lower end portion of each rear wheel house 40, with a length direction of the rear side member 80 in the vehicle front-and-rear direction. A rocker 90 is joined to and formed at the vehicle front side of each rear side member 80.

A rear suspension mounting portion, which is not shown in the drawings, is connected to the rear side member 80 in a vicinity of a lower end portion of the rear wheel house 40. A rear suspension, which is not shown in the drawings, is mounted at the rear suspension mounting portion.

The rear suspension mounting portion is disposed to overlap in a side view with the strainer 60 or an inner reinforcer 100, which is described below.

A lower end portion of the inner reinforcer 100 is connected to an upper end portion of the rear wheel house inner 44 and an upper end portion of the strainer 60.

An upper end portion of the inner reinforcer 100 is connected to a rear pillar 110, which is disposed at the vehicle rear relative to the quarter pillar 30. Thus, the inner reinforcer 100 is a member that connects the rear pillar 110 with the rear wheel house inner 44 and the strainer 60.

A cross-sectional shape of each inner reinforcer 100 orthogonal to a length direction thereof is formed in a hat shape that is open toward the vehicle width direction outer side. A chamber is formed by the inner reinforcer 100 being bonded to the vehicle width direction inner side faces of the rear side panel 20 and the rear wheel house inner 44.

As shown in FIG. 3, the inner reinforcer 100 is provided with a main body portion 102, which extends in the vehicle vertical direction, and a branching portion 104, which extends toward the vehicle upper-rear side from the main body portion. The inner reinforcer 100 has a substantially "Y"-shaped structure in side view.

The branching portion 104 is divided into two members: a first branching portion 104A and a second branching portion 104B. The first branching portion 104A structures the vehicle front side of the branching portion 104 and the second branching portion 104B structures the vehicle rear side of the branching portion 104.

The first branching portion 104A is formed integrally with the main body portion 102. A rear end portion of the first branching portion 104A is bonded to the second branching portion 104B. A rear end portion of the second branching portion 104B is bonded to a rear pillar inner upper 114B of the rear pillar 110, which is described below.

The main body portion 102 and the first branching portion 104A are formed with a constant plate thickness. The plate thickness of the main body portion 102 and first branching portion 104A is specified to be thicker than a plate thickness of the second branching portion 104B.

As shown in FIG. 1 and FIG. 2, a vehicle rear end portion of each rear pillar 110 extends in the vehicle vertical direction along a side edge portion of a back door aperture portion 120. The rear pillar 110 is constituted by a rear pillar outer 112 and a rear pillar inner 114. The rear pillar outer 112 is disposed at the vehicle width direction outer side of the rear side panel 20 and the rear pillar inner 114 is disposed at the vehicle width direction inner side of the rear side panel 20.

A cross-sectional shape of the rear pillar outer 112 orthogonal to a length direction thereof is formed in a hat shape that is open toward the vehicle front side. A chamber is formed by the rear pillar outer 112 being bonded to the vehicle width direction outer side face of the rear side panel 20.

A cross-sectional shape of the rear pillar inner 114 orthogonal to the length direction thereof is formed in a hat shape that is open toward the vehicle rear side. A chamber is formed by the rear pillar inner 114 being bonded to the vehicle width direction inner side face of the rear side panel 20.

The rear pillar inner 114 is structured by three members being connected together: a rear pillar inner center 114A that extends in the vertical direction, the rear pillar inner upper 114B, and a rear pillar inner lower 114C.

The rear pillar inner upper 114B is disposed at a peripheral edge of an inflected portion at the vehicle upper side of the back door aperture portion 120. A lower end portion of the rear pillar inner upper 114B is connected to an upper end portion of the rear pillar inner center 114A. An upper end portion of the rear pillar inner upper 114B is bonded to the roof panel that is not shown in the drawings.

The rear pillar inner lower 114C is disposed at a peripheral edge of an inflected portion at the vehicle lower side of the back door aperture portion 120. An upper end portion of the rear pillar inner lower 114C is connected to a lower end portion of the rear pillar inner center 114A.

As shown in FIG. 2 and FIG. 3, a front end portion of the rear pillar inner upper 114B is connected to a rear end portion of the second branching portion 104B. A plate thickness of the rear pillar inner upper 114B is specified to be thicker than plate thicknesses of the rear pillar inner center 114A and the rear pillar inner lower 114C.

—Operation and Effects—

Now, operation and effects of the present exemplary embodiment are described.

The vehicle rear portion structure according to the present exemplary embodiment is reinforced against a force inputted from the rear suspension by the rear wheel house outers 42, the strainers 60, the rear cross member 50, the inner reinforcers 100 and the rear pillar inner uppers 114B. Thus, torsional rigidity of the vehicle may be improved.

In the vehicle rear portion structure according to the present exemplary embodiment, each rear pillar inner 114 is divided into the rear pillar inner center 114A and the rear pillar inner upper 114B, and the plate thickness of the rear pillar inner upper 114B is specified to be thicker than the plate thickness of the rear pillar inner center 114A.

Therefore, the rigidity of locations that are bonded to the inner reinforcer 100 may be raised, in addition to which an increase in vehicle weight may be suppressed compared to a structure in which the plate thickness of the whole of the rear pillar inner 114 is increased.

In the vehicle rear portion structure according to the present exemplary embodiment, the inner reinforcer 100 includes the main body portion 102 and the branching portion 104. The branching portion 104 is divided into the first branching portion 104A that structures the vehicle front side of the branching portion 104 and the second branching portion 104B that structures the vehicle rear side of the branching portion 104. The plate thicknesses of the main body portion 102 and the first branching portion 104A are specified to be thicker than the plate thickness of the second branching portion 104B.

Therefore, a degree of freedom of positioning of the inner reinforcer 100 may be improved, and interference between the inner reinforcer 100 and other structural members (for example, the triangular window aperture portion 22 and the refueling aperture portion 24) may be suppressed.

Furthermore, because the branching portion 104 is divided into the first branching portion 104A and the second branching portion 104B, the first branching portion 104A may be assembled to the strainer 60, and subsequently the first branching portion 104A may be assembled to the second branching portion 104B to which the rear pillar inner 114 is joined. Thus, ease of assembly is improved.

Because the plate thicknesses of the main body portion 102 and the first branching portion 104A are thicker than the plate thickness of the second branching portion 104B, rigidity of the vicinity of the rear wheel house 40 may be raised while an increase in vehicle weight is suppressed, and torsional deformation may be suppressed efficiently.

Second Exemplary Embodiment

Figure 4:
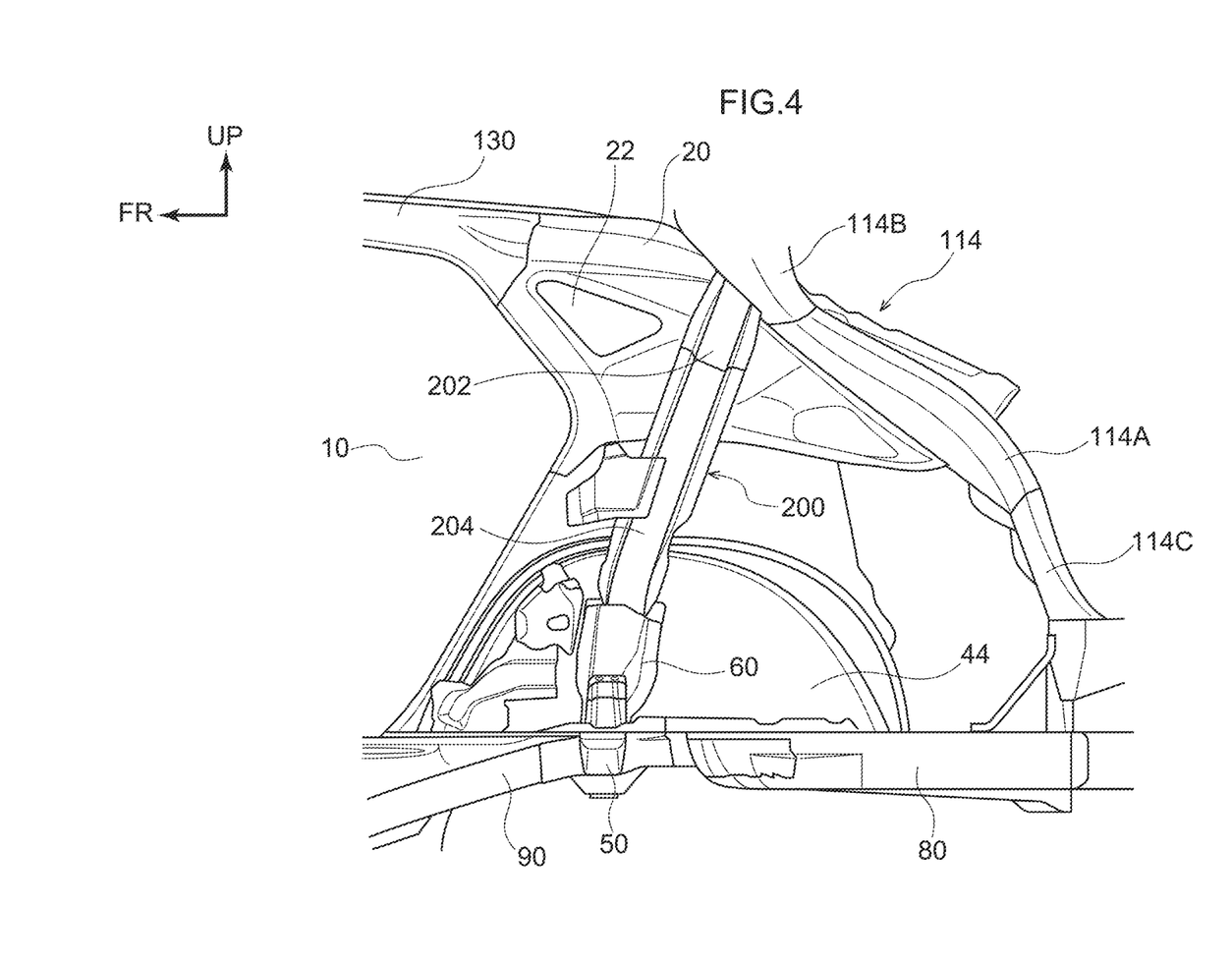
FIG. 4 is a side view in which the vehicle right side of a vehicle rear portion structure according to a second exemplary embodiment is seen from the vehicle inner side.

Now, a vehicle rear portion structure according to a second exemplary embodiment of the present disclosure is described using FIG. 4. Structures according to the second exemplary embodiment that are the same as in the first exemplary embodiment are assigned the same reference symbols and are not described here.

In the first exemplary embodiment, the inner reinforcer 100 includes the main body portion 102 and the branching portion 104. The present exemplary embodiment differs from the first exemplary embodiment in that an inner reinforcer 200, which is described below, connects the rear wheel house inner 44 and the strainer 60 with the rear pillar inner upper 114B linearly.

In FIG. 4, a lower end portion of the inner reinforcer 200 is bonded to the rear wheel house inner 44 and the strainer 60, and the inner reinforcer 200 extends linearly to the vehicle upper rear. A vehicle upper end portion of the inner reinforcer 200 is bonded to the rear pillar inner upper 114B.

A cross-sectional shape of the inner reinforcer 200 orthogonal to the length direction thereof is formed in a hat shape that is open toward the vehicle width direction outer side. A chamber is formed by the inner reinforcer 200 being bonded to vehicle width direction inner side faces of the rear wheel house inner 44 and the rear pillar inner upper 114B.

The inner reinforcer 200 is divided into an inner reinforcer upper 202 and an inner reinforcer lower 204. The inner reinforcer upper 202 structures the vehicle upper side of the inner reinforcer 200 and the inner reinforcer lower 204 structures the vehicle lower side of the inner reinforcer 200.

An upper end portion of the inner reinforcer upper 202 is bonded to the rear pillar inner upper 114B, and a lower end portion of the inner reinforcer upper 202 is bonded to an upper end portion of the inner reinforcer lower 204. A lower end portion of the inner reinforcer lower 204 is bonded to the rear wheel house inner 44 and the strainer 60.

A plate thickness of the inner reinforcer lower 204 is specified to be thicker than a plate thickness of the inner reinforcer upper 202.

—Operation and Effects—

Now, operation and effects of the present exemplary embodiment are described.

In the vehicle rear portion structure according to the present exemplary embodiment, the inner reinforcer 200 linearly connects the rear wheel house inner 44 and the strainer 60 with the rear pillar inner upper 114B. Therefore, a torsional deformation of the vehicle may be efficiently taken up by the inner reinforcer 200 and, because a length of the inner reinforcer 200 may be kept short, an increase in vehicle weight may be suppressed.

Vehicle rear portion structures according to the first exemplary embodiment and the second exemplary embodiment are described above, but it will be clear that numerous modes may be embodied within a scope not departing from the gist of the present disclosure.

For example, in the exemplary embodiments described above, the rear pillar inner 114 is divided into the rear pillar inner center 114A and the rear pillar inner upper 114B and the plate thickness is varied to produce a difference in rigidity therebetween, but this is not limiting. For example, a difference in rigidity may be produced by a variation of material between the rear pillar inner center 114A and the rear pillar inner upper 114B, and a difference in rigidity may be produced by setting a bead structure or the like at the rear pillar inner upper 114B.

In the exemplary embodiments described above, the inner reinforcer 100 (or 200) is divided into the first branching portion 104A (or inner reinforcer lower 204) and the second branching portion 104B (or inner reinforcer upper 202), and a difference in rigidity is produced by a variation in plate thickness therebetween, but this is not limiting. For example, a difference in rigidity may be produced by a variation of material between the first branching portion 104A (inner reinforcer lower 204) and the second branching portion 104B (inner reinforcer upper 202), and a difference in rigidity may be produced by setting a bead structure or the like at the first branching portion 104A (inner reinforcer lower 204).

What is claimed is:

1. A vehicle rear portion structure, comprising:
   a cross member that extends in a vehicle width direction at a vehicle rear;
   a rear wheel house that accommodates a rear tire;
   a rear pillar that extends in a vehicle vertical direction;
   a reinforcing member that connects the rear pillar with the rear wheel house; and
   a joining member that connects a lower end portion of the reinforcing member with one end portion of the cross member, wherein:
   the rear pillar is divided into:
      a general portion, and
      a high-rigidity portion that is connected to an upper end portion of the general portion and has a higher rigidity than the general portion,
   the reinforcing member is directly connected to the high-rigidity portion, and
   a plate thickness of the high-rigidity portion is greater than a plate thickness of the general portion.

2. The vehicle rear portion structure according to claim 1, wherein the reinforcing member linearly connects the high-rigidity portion with the rear wheel house.

3. The vehicle rear portion structure according to claim 2, wherein
   the reinforcing member includes an upper portion and a lower portion, and
   a plate thickness of the lower portion is greater than a plate thickness of the upper portion.

4. The vehicle rear portion structure according to claim 1, wherein the reinforcing member comprises:
   a vertical extension portion that extends in the vehicle vertical direction from the rear wheel house, and
   a front-rear extension portion that extends toward the vehicle rear in a vehicle front-rear direction from an upper end portion, in the vehicle vertical direction, of the vertical extension portion.

5. The vehicle rear portion structure according to claim 4, wherein
   the front-rear extension portion of the reinforcing member comprises a front side reinforcing member and a rear side reinforcing member, and
   a plate thickness of the front side reinforcing member is greater than a plate thickness of the rear side reinforcing member.

6. The vehicle rear portion structure according to claim 5, wherein
   a plate thickness of the vertical extension portion of the reinforcing member is greater than the plate thickness of the rear side reinforcing member.

7. The vehicle rear portion structure according to claim 5, wherein
   the front side reinforcing member is formed integrally with the vertical extension portion of the reinforcing member.

8. The vehicle rear portion structure according to claim 5, wherein the plate thickness of the front side reinforcing member is same as a plate thickness of the vertical extension portion of the reinforcing member.

9. The vehicle rear portion structure according to claim 1, wherein the reinforcing member is divided, in a vehicle front-rear direction, into a front side reinforcing member and a rear side reinforcing member.

10. The vehicle rear portion structure according to claim 9, wherein a rigidity of the front side reinforcing member is higher than a rigidity of the rear side reinforcing member.

11. The vehicle rear portion structure according to claim 1, wherein a lower end portion of the reinforcing member is connected to an upper end portion of the rear wheel house.

* * * * *